Figure 1:
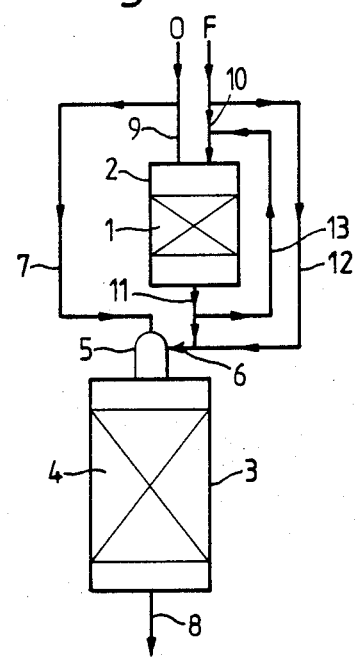

United States Patent [19]

Pinto et al.

[11] Patent Number: 4,788,004
[45] Date of Patent: Nov. 29, 1988

[54] CATALYTIC PROCESS

[75] Inventors: Alwyn Pinto, Middlesbrough; Peter J. Davidson, Darlington; Antony P. J. Limbach, Stockton-on-Tees, all of England

[73] Assignee: Imperial Chemical Industries PLC, London, England

[21] Appl. No.: 52,004

[22] Filed: May 20, 1987

[30] Foreign Application Priority Data

May 27, 1986 [GB] United Kingdom ............... 8612777
Apr. 13, 1987 [GB] United Kingdom ............... 8708776

[51] Int. Cl.⁴ .............................................. C01J 3/46
[52] U.S. Cl. .................................................. 252/373
[58] Field of Search ....................................... 252/373

[56] References Cited

U.S. PATENT DOCUMENTS

| | | | |
|---|---|---|---|
| 3,388,074 | 6/1968 | Reitmeier | 252/373 |
| 4,351,647 | 9/1982 | Marion et al. | 252/373 |
| 4,392,869 | 7/1983 | Marion et al. | 252/373 |
| 4,394,137 | 7/1983 | Marion et al. | 252/373 |
| 4,522,894 | 6/1985 | Hwang et al. | |

FOREIGN PATENT DOCUMENTS 1137930 12/1968 United Kingdom .

OTHER PUBLICATIONS

"Synthesis-Gas Process Blends Best of Two Routes," *Chemical Engineering*, Jan. 3, 1966, pp. 24-26.

*Primary Examiner*—John Doll
*Assistant Examiner*—Wayne A. Langel
*Attorney, Agent, or Firm*—Cushman, Darby & Cushman

[57] ABSTRACT

A catalytic partial oxidation or secondary reforming process wherein a flame is established at a burner upstream of the catalyst is started-up by catalytic combustion of a suitable combustible material to produce a hot gas stream and directly, or indirectly, using the heat from the gas stream to heat the reactants fed to the burner to the autoignition temperature. After a flame has been established at the burner, production of the hot gas stream by combustion of the combustible material is discontinued.

12 Claims, 3 Drawing Sheets

CATALYTIC PROCESS

This invention relates to a catalytic process for the production of a gas stream containing hydrogen and carbon oxides from a hydrocarbon, or hydrocarbon derivative, feedstock by the reaction of said feedstock with an oxidant gas containing free oxygen, e.g. air, oxygen, or oxygen-enriched air, and optionally with steam and/or carbon dioxide, in the presence of a catalyst, and particular to the start-up of such a process.

Such processes are well known and include the so-called catalytic partial oxidation and secondary reforming processes.

In these processes, which are operated continuously and generally effected at elevated pressure, the feedstock stream is partially combusted and then the combustion products are passed over a catalyst, herein termed a conversion catalyst, to bring the combustion products towards equilibrium. Where employed, steam and/or carbon dioxide, is included in one or both of the reactant streams or may be fed as a separate stream.

While there have been proposals, for example in "Chemical Engineering" Jan. 3 1966 pages 24–26, GB-A No. 1137930, and U.S. Pat. No. 4,522,894, of autothermal reforming wherein the combustion is effected catalytically, for example by the provision of a bed of a combustion catalyst upstream of the conversion catalyst, such processes suffer from the disadvantage that there is a risk that the combustion catalyst will become deactivated by continued exposure to high temperatures and/or by the deposition of carbon. Also there is a risk that the feedstock may autoignite and the resulting flame will damage the combustion catalyst and/or the vessel.

It is therefore more usual to employ non-catalytic combustion by feeding the reactants to a burner whereat a flame is formed.

Start-up of such a catalytic partial oxidation process intended to be operated at elevated pressures is normally effected by feeding the feedstock and oxidant at atmospheric pressure to the burner, and igniting the feedstock/oxidant gas mixture to form a flame. However in order to ignite the mixture it is necessary to employ an oxidant-rich mixture, whereas in normal operation a feed-rich mixture is required so that only partial combustion takes place. This necessitates that the burner employed has to be changed, after ignition, from a burner suitable for oxidant-rich operation to a burner suitable for feed-rich operation. Not only does the need for such a burner change lengthen the time required for start-up but also is inelegant and, to some extent, hazardous as it involves the handling of hot burners.

Also the use of initial oxidant-rich operation means that the resultant product gas often has to be vented where there is a downstream catalyst that is sensitive to oxygen.

In secondary reforming the secondary reformer feedstock is a primary reformed gas stream. In some reforming processes, for example as proposed in EP-A No. 124226 and U.S. Pat. No. 3,442,613, the heat required for the endothermic primary reforming stage is supplied by the heat in the gas stream leaving the secondary reforming stage: in such processes the start-up is subject to the same problems as in the aforementioned partial oxidation process.

In the present invention these problems are overcome by effecting autoignition at the burner: the reactants are heated to the autoignition temperature, directly or indirectly, by a hot gas stream produced by catalytic combustion.

Accordingly the present invention provides a method of start-up of a continuous process for the production of a gas stream containing hydrogen and carbon oxides wherein reactant streams including (a) a stream containing a gaseous hydrocarbon, or hydrocarbon derivative, feedstock, and (b) a stream containing an oxidant gas containing free oxygen, are separately fed, at elevated pressure, to a burner where partial combustion takes place, and the combustion products are fed over a catalyst to bring the combustion products towards equilibrium, comprising (i) producing a hot gas stream by effecting at least partial combustion of a stream of a gaseous combustible material and an oxidant gas containing free oxygen, said hot gas stream being produced at least initially by catalytic combustion by passing said combustible material and said oxidant gas over a combustion catalyst;

(ii) heating at least one of the reactant streams, directly or indirectly, with said hot gas stream to a temperature above the autoignition temperature of said reactants and feeding the reactants streams to said burner, whereby autoignition of said reactant streams is effected to produce a flame at said burner and self-sustaining combustion of said feedstock is established; and thereafter (iii) discontinuing the production of said hot gas stream while continuing feed of said reactant streams to the burner.

In one form of the invention the hot gas stream is passed over the conversion catalyst so as to heat the conversion catalyst and the reactant streams passing thereover: when the autoignition temperature is reached, the flame produced by autoignition will flash to the burner. The combustion catalyst may be in the form of a bed thereof in the same vessel as the conversion catalyst or, preferably, it may be in a separate vessel. Where the combustion catalyst is in the same vessel as the conversion catalyst, it may be located upstream of the burner or downstream thereof. Particularly where the combustion catalyst is upstream of the burner, for example where it is in a separate vessel, provision may be made for isolating or bypassing the combustion catalyst so that it is taken out of service when start-up has been accomplished. Alternatively, as described below, where the combustion catalyst is upstream of the burner, it may remain in-line with one of the reactant streams or, where it is downstream of the burner, it may remain in-line so that the combusted gas from the burner passes through the combustion catalyst.

In another form of the invention the combustion catalyst is in the same vessel as the conversion catalyst or in a separate vessel, but is downstream of the conversion catalyst so that the effluent gas from the conversion catalyst passes through the combustion catalyst. In this embodiment the hot gas stream from the combustion catalyst is used to heat one or more of the influent reactant streams by indirect heat exchange before the latter are fed to the burner, and/or by recycle of part of the hot gas stream leaving the combustion catalyst to the burner. Such recycle may also be desirable, to speed up heating, where the combustion catalyst is upstream of the conversion catalyst. It will be appreciated that, after autoignition has been accomplished, such recycle can be reduced or stopped.

Where the combustion catalyst is downstream of the conversion catalyst, the combustion catalyst may remain in-line with the effluent from the conversion catalyst or, particularly where the combustion catalyst is located in a separate vessel, it may be bypassed or isolated after autoignition has been established.

Although the process reactants may be preheated by indirect heat exchange with the hot gas stream produced from a separate vessel containing the combustion catalyst, it is preferred that, during the start-up, either the hot gas stream from the combustion catalyst is passed through the conversion catalyst, or the effluent gas from the conversion catalyst, preferably together with additional oxidant gas and/or combustible material, is passed through the combustion catalyst.

The feed of at least one of the combustible material and oxidant gas to the combustion catalyst is preferably separate from the feed of the feedstock and oxidant reactants to the burner. In this way the combustion catalyst can be taken out of combustion service, although it may still remain in-line with one of the reactants, combusted gas, or effluent from the conversion catalyst, by stopping the feed of the combustible material and/or oxidant gas to the combustion catalyst. However, even where there is no such separate feed and the combustion catalyst remains in-line, combustion over the combustion catalyst can be discontinued thereby ceasing production of the hot gas stream by combustion of the combustible material with the oxidant gas by ensuring that, after autoignition has been achieved and self-sustaining combustion at the burner established, the feed of the reactants stream to the burner is sufficiently feedstock-rich that there is no oxidant gas in the mixture fed to the combustion catalyst.

It is preferred that whether or not the combustion catalyst is downstream of the conversion catalyst at least one of the reactant streams is preheated by indirect heat exchange with the effluent gas stream from the conversion catalyst. In one preferred form of the invention, the feedstock stream to the burner comprises a primary steam reformed gas stream and the endothermic heat of reaction required to effect such primary steam reforming is supplied by heat from the effluent gas stream from the conversion catalyst.

The hydrocarbon, or hydrocarbon derivative, feedstock can in principle be any hydrocarbon, or derivative thereof, that can be vaporised. Usually it has a boiling point, at atmospheric pressure, under 220° C. and preferably is gaseous at ambient temperature and atmospheric pressure. The feedstock is preferably natural gas or naphtha, or a derivative such as methanol or a partially reformed gas derived from natural gas, naphtha, or methanol. If sulphur containing, the feedstock is preferably desulphurised prior to feeding to the burner. Where there is a preliminary primary steam reforming step, the feeedstock stream fed to the burner is preferably the gas stream resulting from the primary steam reforming of natural gas, naphtha, or methanol, and will generally comprise hydrogen, methane, steam, and carbon oxides. The combustible material is preferably natural gas or naphtha or a hydrogen-containing stream, e.g. a primary reformed gas stream or ammonia, or methanol, synthesis gas, or purge gas from ammonia or methanol synthesis.

The oxidant gas of the oxidant gas stream fed to the burner is preferably the same as that passed over the combustion catalyst and is preferably air. As mentioned hereinbefore the reactant stream or streams may, and at least one preferably does, include steam: steam may also be present in one or both of the gas streams fed to the combustion catalyst.

The combustion catalyst is preferably a platinum group metal, particularly platinum, rhodium, and/or palladium, on a suitable ceramic or metal support: the support preferably has a high geometric surface area per unit combustion catalyst bed volume; for example it may be a honeycomb or one or more coils of a corrugated metal sheet and may be impregnated directly with the catalytically active material. Alternatively the latter may be present in a wash coat applied to the support.

When a combustible material, e.g. natural gas, and an oxidant gas, e.g. air, are passed over a combustion catalyst, the combustion reaction proceeds and, as a consequence, the temperature of the resultant gas stream, and of the combustion catalyst, increases. If the gas velocity is not too great and/or the inlet temperature is not too low, for a gas mixture of given composition, at some distance through the combustion catalyst bed, e.g. honeycomb, a rapid increase in temperature occurs as the maximum amount of combustion of that gas mixture takes place. Depending on the combustible material:oxidant gas ratio, which also affects the magnitude of the peak temperature, and hence combustion catalyst bed exit temperature, this may correspond to partial or complete combustion. Initially, even at low gas velocities, this temperature peak may not be established as a result of too low an inlet temperature. The gas inlet temperature will generally depend on the degree of preheating, if any, of the combustible material e.g. as a result of any desulphurisation step, and of the oxidant gas, e.g. as caused by compression. In some cases there may be an external heat source available that is not hot enough to heat the reactant streams to the autoignition temperature. However this external heat source can be used for preheating the gas streams fed to the combustion catalyst and, possibly, also one or more of the reactant streams. Where the preheating of the gas fed to the combustion catalyst does not effect sufficient heating to effect the desired temperature rise in the combustion catalyst, some of the gas leaving the combustion catalyst may be recycled to the combustion catalyst inlet thereby effectively increasing the inlet temperature. The inlet gas composition, velocity, and degree, if any, of recycle should be chosen such that the aforesaid peak temperature is achieved before autoignition at the burner occurs.

If the stream containing the combustible material fed to the combustion catalyst also contains steam, since the combustion catalyst generally exerts some reforming activity, the gas stream leaving the combustion catalyst will be partially reformed and so will contain some hydrogen. Recycle of such gas leaving the combustion catalyst to the combustion catalyst inlet then has the advantage of introducing hydrogen into the combustible material fed to the combustion catalyst. The presence of hydrogen in the combustible material fed, or recycled, to the combustion catalyst is advantageous since the inlet temperature at which hydrogen can be combusted by a combustion catalyst is relatively low and so rapid attainment of the peak temperature on start-up of the catalytic combustion can readily be achieved. For this reason the use of a gas stream containing hydrogen, such as ammonia, or methanol, synthesis or purge gas, as at least part of the combustible material is advantageous.

Where, as is preferred, the hot gas stream from the combustion catalyst passes through the conversion catalyst, it is advantageous if the hot gas stream passed through the conversion catalyst also contains hydrogen, e.g. as a result of only partial combustion of such hydrogen- or steam-containing combustible material in the combustion catalyst: thus where the conversion catalyst is a newly charged conversion catalyst precursor and has to be reduced to active catalyst before becoming effective, the passage of the hydrogen-containing hot gas stream through the conversion catalyst precursor will effect some of the necessary reduction, thereby shortening the overall start-up time.

In some cases, particularly where there is recycle of part of the gas stream leaving the combustion catalyst to the inlet thereof, autoignition of the combustible material fed to the combustion catalyst may occur with the formation of a flame in the region between the admixture of the combustible material and the oxidant gas and the actual inlet to the combustion catalyst. In this case, thereafter, the combustion catalyst may in fact have little effect on the combustion producing the hot gas stream being used to heat, directly, or indirectly, the reactant stream or streams fed to the burner. Thus in this case the hot gas stream is only initially produced by catalytic combustion.

It is normally necessary that the flow rate of gas through the burner is above a certain minimum, dependent on the design of the burner, so that, when ignition occurs, a stable flame is produced. The amount of combustion catalyst should be chosen such that an adequate amount of hot gas is produced to effect the desired direct, or indirect, heating of the reactant streams fed to the burner.

Where the combustion catalyst is upstream of the conversion catalyst with no direct or indirect recycle of heat to the combustible material fed to the combustion catalyst, to achieve a sufficiently rapid start-up, the combustion catalyst bed volume is typically 1-50%, particularly 2-20%, of the volume of the conversion catalyst bed.

Where as is preferred, there is direct, or indirect, recycle of heat from the gas leaving the combustion catalyst and/or the gas leaving the conversion catalyst to the combustible material fed to the combustion catalyst, the combustion catalyst bed volume is generally below 10% of the conversion catalyst bed volume and is typically 0.1 to 3% thereof.

The amount of combustion catalyst employed is generally well below that that would be required to effect the desired degree of partial combustion of the reactants fed to the burner at the design flow rate of those reactants in normal operation of the continuous process.

As mentioned hereinbefore the combustion catalyst may exert some activity as a conversion catalyst. Indeed in some cases the two catalysts may both comprise platinum group metals on a suitable support as aforesaid. However the combustion catalyst will generally have an appreciably higher loading of the platinum group metal, expressed in terms of the amount of active metal per unit geometric surface area of the support.

Normally the autoignition at the burner is achieved by feeding the feedstock reactant stream to the burner, together with the hot gas stream and/or with preheating of the feedstock reactant stream by heat exchange with the hot gas stream, until the temperature of the feedstock reactant stream, or mixture thereof with the hot gas stream, is above the autoignition temperature. Then feed of the oxidant reactant stream, preferably preheated, is commenced and autoignition ensues. In this way it is not necessary that the effluent from the conversion catalyst is vented where there is an oxidant sensitive catalyst downstream thereof.

The rates at which the reactant streams are fed to the burner should gradually be increased until the desired flow rates are achieved: the composition of the reactants, i.e. proportions of the reactant streams or of the ingredients thereof, may be modified as the start-up procedure proceeds.

At any suitable time after autoignition and self-sustaining partial combustion have been established at the burner, the production of the hot gas stream by at least partial combustion of the combustible material with the oxidant gas is stopped. Where the feed of combustible material and/or oxidant to the combustion catalyst is separate from the feed of the reactants to the burner, this cessation of production of the hot gas stream may be effected by discontinuing this separate feed, and, particularly where the combustion catalyst is in a separate vessel, by isolating or bypassing of the combustion catalyst, at any suitable time after autoignition at the burner has occured. The cessation of feed and, in appropriate cases, isolation or bypass, may however be effected before the full desired flow rates of the reactant streams have been reached. Where the combustion catalyst remains in-line and is downstream of the burner and there is no separate feed of oxidant to the combustion catalyst, it will be appreciated that, after autoignition has been achieved, the cessation of the production of the hot gas stream by combustion of the combustible material with the oxidant gas is naturall effected by virtue of the fact that the partial combustion at the burner utilises essentially all the available oxidant. In this case, after autoignition has been achieved, the combustion catalyst may have little or no effect: however, often the combustion catalyst will also have some activity as a conversion catalyst and so will augment the latter.

The invention is illustrated by the accompanying drawings wherein

Figure 2:
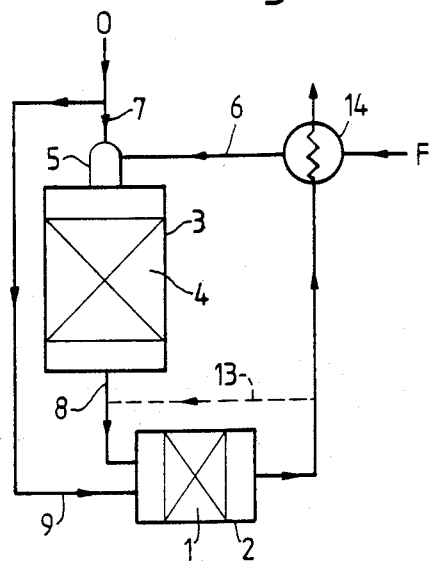
Figure 3:
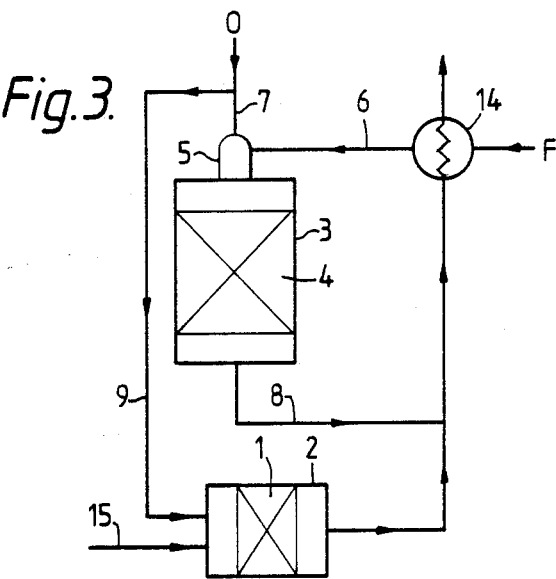
Figure 4:
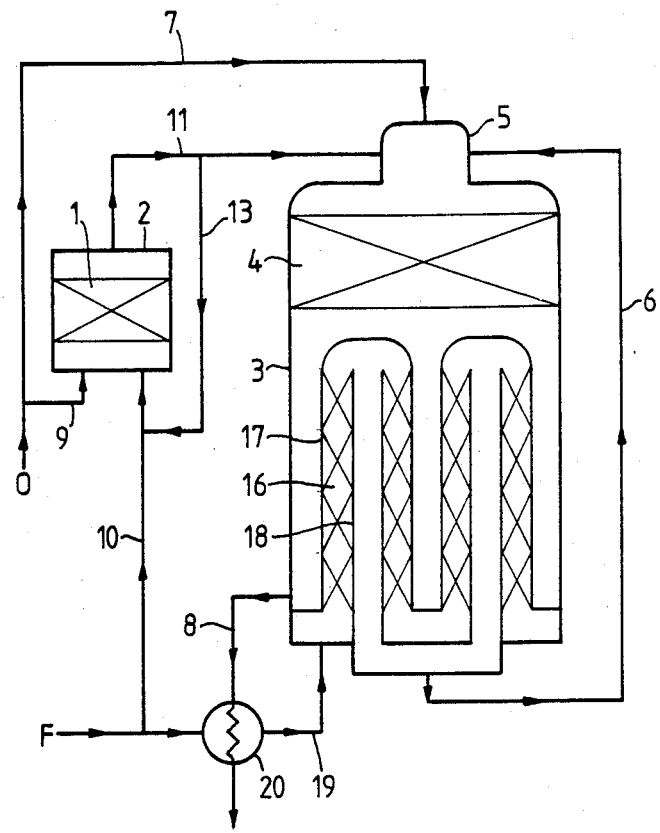
Figure 5:
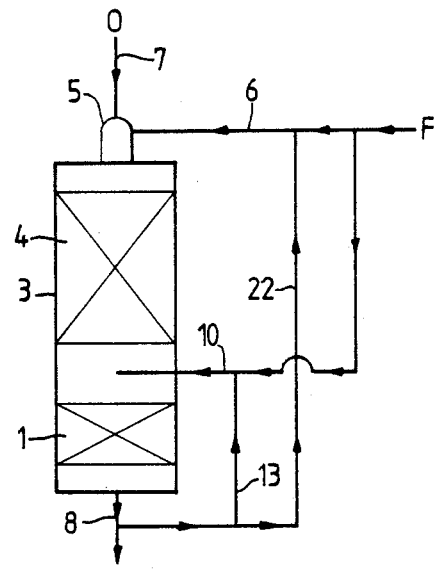
Figure 6:
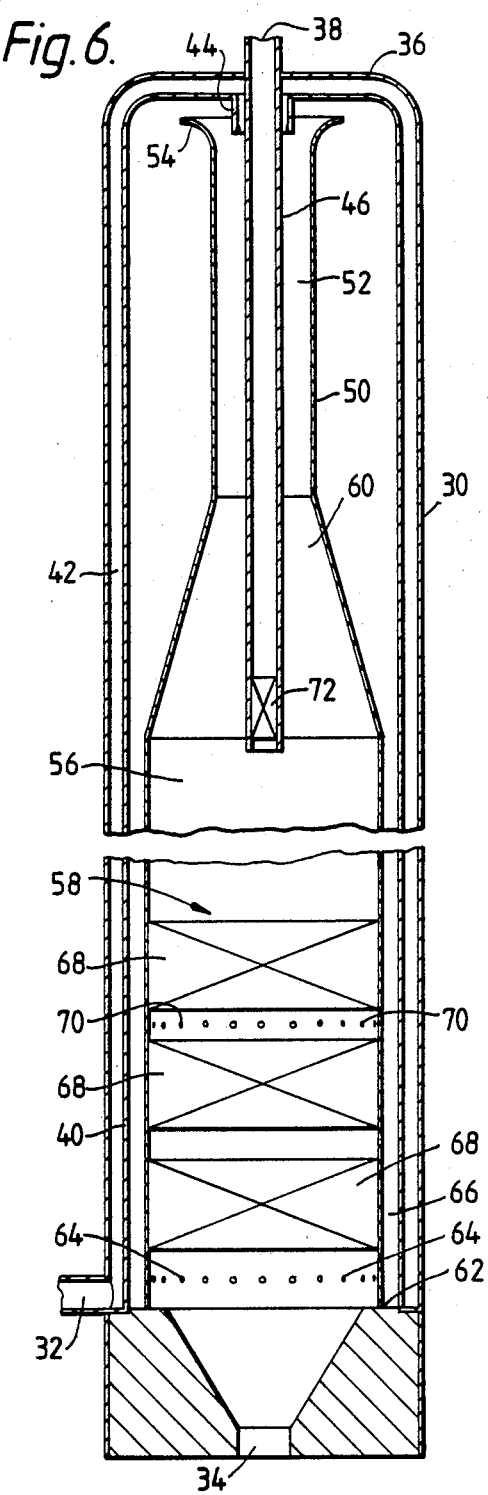
Figure 7:
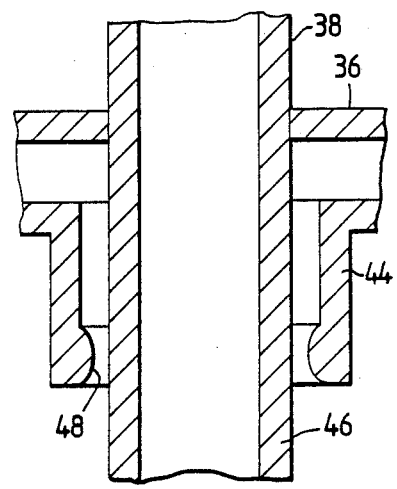

FIGS. 1 to 4 diagrammatically show arrangements wherein the two catalysts are in separate vessels, FIG. 4 showing the application to a primary/secondary reforming system wherein the primary reformer is heated by the secondary reformer effluent;

FIG. 5 diagrammatically shows an arrangement wherein the combustion catalyst is downstream of the conversion catalyst but is in the same vessel as the conversion catalyst;

FIG. 6 is a diagrammatic longitudinal section through a preferred embodiment of part of the apparatus shown in FIGS. 1 to 4; and FIG. 7 is an enlargement of part of FIG. 6.

In describing the drawings and the processes associated therewith, it is assumed that the basic feedstock is desulphurised natural gas and the oxygen-containing gas is air.

In FIG. 1 the combustion catalyst 1 is located in a vessel 2 upstream of the vessel 3 used for the desired process and containing the conversion catalyst 4 for that process. This conversion catalyst is typically nickel supported on a suitable support, e.g. ceramic rings or monolith such as a honeycomb. In normal operation natural gas is fed to the burner 5 of vessel 3 via line 6 and air is fed thereto via line 7, and the combusted gas stream, after being brought towards equilibrium over the conversion catalyst 4, leaves vessel 3 via line 8.

During the start-up oxidant gas, e.g. air, and combustible material (which is here shown to be the same as the feedstock to burner 5) are fed, via lines 9 and 10 respectively, to vessel 2, and the hot gas from vessel 2 is fed, via line 11, to the feedstock inlet 6 of the burner 5 of vessel 3. Initially some natural gas may be fed directly to burner 5 (via a line 12 bypassing vessel 2). The amount of air fed to vessel 2 via line 9 is such that there is incomplete combustion in the combustion catalyst. The gas fed via line 6 to burner 5 thus is the hot, partially combusted, effluent from line 11 together with any natural gas bypassing the vessel 2 via line 12. The feed of natural gas to burner 5 via bypass 12 is then commenced or increased, if necessary, to such a rate that a stable flame would be formed at burner 5 when air is supplied thereto. When the temperature of the mixture of natural gas and the hot gas stream fed to burner 5 has increased to a temperature above the autoignition temperature, the feed of air to burner 5 is commenced. Autoignition then occurs establishing a flame at burner 5. The flow rate of natural gas (to which steam may be added e.g. by saturation) fed to burner 5 may then be gradually increased to the desired level: the air flow rate may, or may not, need to be increased.

To increase the rate at which the effluent from vessel 2 reaches the desired temperature, part of the hot gas leaving vessel 2 via line 11 may be recycled to the feedstock inlet 10 thereof via line 13 (which may, as described below, be a recycle duct within the vessel 2).

After a flame has been established at the burner 5, feed of natural gas via line 10 and air via line 9 to vessel 2 is stopped so that vessel 2 is totally bypassed via lines 7 and 12. Alternatively in some cases it may be desirable to omit bypass line 12 so that all the feedstock passes through the combustion catalyst 1. In this case, after autoignition at burner 5 has been achieved, the combustion catalyst may effectively be taken out of service, stopping the production of the hot gas stream by the combustion of the natural gas in vessel 2, by closing line 9 so that the air is fed, via line 7, only to the burner 5.

In the embodiments of FIGS. 2 and 3, the combustion catalyst 1 is located in a separate vessel 2 downstream of the conversion catalyst 4 and the gas is passed, via line 8, through a heat exchanger 14 to transfer heat to the feedstock fed to the burner 5 via line 6.

In the embodiment of FIG. 2, vessel 2 is located in line 8 before heat exchanger 14 so that the gas leaving the conversion catalyst 4 provides the feedstock to the combustion catalyst 1. Air is supplied to vessel 2 via line 9. As in the embodiment of FIG. 1 there may be a recycle line 13 (shown dotted in FIG. 2) and the combustion catalyst is effectively taken out of service, when autoignition at burner 5 has been established, by stopping the supply of air via line 9 to the combustion catalyst.

In the embodiment of FIG. 3, which is less preferred, the combustion catalyst 1 is not in-line with the process stream but is in a separate unit feeding hot gas into the gas stream leaving conversion catalyst 4 via line 8 prior to heat exchanger 14. In this example the feedstock to the combustion catalyst 1 is shown as a separate stream 15, i.e. not part of the feedstock stream fed via line 6 to the burner 5. Thus the feedstock stream 15 may be chemically dissimilar to that fed to burner 5.

In the embodiment of FIG. 4, interposed in the natural gas/steam feed line to burner 5, is a primary reformer containing a primary reforming catalyst 16 disposed in tubes through which a mixture of steam and feedstock passes, and these tubes are heated by the gas leaving the conversion catalyst 4. While the primary reformer may be of the conventional design and in a separate vessel to that containing the conversion catalyst, in the embodiment illustrated an integrated primary/secondary reformer is shown. In this embodiment the primary reformer tubes (two of which are shown—in practice there will be a much greater number) are located inside vessel 3 so that the gas leaving the conversion catalyst, here a secondary steam reforming catalyst, 4 heats these tubes. Each reforming tube comprises an outer tube 17 closed at its upper end and having a concentric inner tube 18 extending within the outer tube 17 for most of the length of the latter. The annular space between the inner and outer tubes is filled with the primary reforming catalyst 16. The feedstock is fed to vessel 3 via line 19 and enters the open ends of the outer tubes 17. It then flows up through the annular space filled with catalyst 16 and then passes down the inner tubes 18. It is then fed, via line 6, to the burner 5. Line 6 may be, as shown, external to vessel 3 or, preferably, is a suitable duct within vessel 3.

The gas leaving secondary reforming catalyst 4 leaves vessel 3 via line 8 after heating tubes 17 and passes through a heat exchanger 20 to preheat the influent feedstock/steam mixture flowing from a supply 21 to line 19 via heat exchanger 20.

In this embodiment the combustion catalyst 1 is located in a separate vessel 2 and is supplied with air via line 9 and a natural gas/steam mixture, from supply 21, via line 10: the hot gas stream formed by the catalytic combustion of the natural gas/steam and air in vessel 2 is fed to the burner 5 of the secondary reformer via line 11. After autoignition has occurred and a flame established at the burner 5, the supply of air and/or natural gas to vessel 2 via lines 9 and 10 is stopped. As in the embodiment of FIGS. 1 and 2 part of the gas leaving the combustion catalyst 1 may be recycled to the inlet thereof via line 13. In this embodiment it will be appreciated that before autoignition occurs at burner 5, the gas flowing through the primary reforming catalyst 16 in the annular space between inner tubes 18 and outer tubes 17 will be essentially unreformed. As tubes 17 and hence catalyst 16 become heated, reforming will commence and so the feed to the burner 5 will change from a natural gas/steam mixture to a primary reformed gas mixture.

In FIG. 5 the combustion catalyst 1 is in the same vessel as the conversion catalyst 4 but is downstream thereof. In this case to effect the heating to the autoignition temperature, it is necessary to recycle part of the gas leaving the vessel 3 via line 8 to the feedstock inlet 6 via line 22. Alternatively, instead of recycling part of the gas leaving the vessel to the feedstock via line 22, one or more heat exchangers may be incorporated so that heat in the gas leaving the vessel via line 8 is transferred to the air fed via line 7 and/or to the feedstock fed via line 6.

In the embodiment of FIG. 5 a supply of combustible material is fed to the inlet to the combustion catalyst via line 10. This system is started-up with air supplied to burner 5 via line 7 and natural gas, preferably also containing steam, to the combustion catalyst 1 via line 10. The amount of air is such that incomplete combustion takes place in the combustion catalyst 1 so that the hot gas recycled via line 22 contains some combustible material. When this recycled gas is hot enough, autoignition of the combustible material in the recycled hot gas occurs at burner 5 establishing a flame. Before or after establishing a flame at burner 5, the feed of fresh feedstock to burner 5 is commenced. Thereafter the supply of natural gas to the combustion catalyst via line 10 is discontinued. As in the embodiments described above part of the gas leaving the combustion catalyst 1 may be recycled to the inlet thereof via line 13.

Alternatively, instead of feeding air via line 7 to the burner and natural gas via line 10 at commencement of start-up, natural gas can be fed to burner 5 and air fed to a location between the burner and combustion catalyst via a line not shown. As before, partial combustion takes place in combustion catalyst 1 giving a hot gas stream which is recycled to burner 5. When this recycle stream is hot enough to cause the mixture thereof with fresh natural gas fed to burner 5, autoignition occurs at burner 5 on commencement of the supply of air to burner 5. After such autoignition, the supply of air to the position between the burner and combustion catalyst is then stopped.

In some cases it may be possible to omit a separate supply of combustible material and/or oxidant gas to the position between the burner and the combustion catalyst.

It will be appreciated that in a similar arrangement, the combustion catalyst could be upstream of conversion catalyst 1 but downstream of the burner. In this case the provision of a separate supply of combustible material to the combustion catalyst is not necessary and autoignition at the burner could be established simply by flash-back from the surface of the combustion catalyst to the burner. However, after start-up, the flame is liable to be so hot that the combustion catalyst would be damaged thus preventing future start-ups. This may be avoided by having the combustion catalyst sandwiched within the conversion catalyst, preferably with a separate supply of combustible material to the inlet of the combustion catalyst. In this way, after a flame has been established at the burner, an endothermic reaction, e.g. reforming of the feedstock with steam, can cool the gas before it encounters the combustion catalyst and so avoids damaging the latter. Prior to autoignition there will be little or no such endothermic reaction upstream of the combustion catalyst and little endothermic reaction downstream thereof and so start-up is not unduly hindered.

One preferred form of apparatus for use as the combustion catalyst containing vessel 2 as shown in FIGS. 1 to 4 is shown in FIGS. 6 and 7.

In the embodiment of FIGS. 6 and 7, the apparatus consists of an outer cylindrical shell 30 designed to withstand the process pressure, which is typically in the range 5 to 60 bar abs. At one end of the shell 30 is an inlet port 32 for a first gas stream consisting of a steam/natural gas mixture, and an outlet port 34 for the product gas stream. At the other end 36 of the shell 30 is an inlet port 38 for air. Located within the shell 30 and sealed thereto at the end adjacent inlet port 32 is a liner 40. Liner 40 extends almost to the other end 36 of the shell 30 and thus defines an annular conduit 42 between the interior surface of the shell 30 and the exterior surface of the liner 40. Inlet port 32 connects with this annular conduit 42. At the end 36 of the shell 30, liner 40 extends across the shell 30, and terminates in a cylindrical portion 44 surrounding, but spaced from, a pipe 46 forming an air supply means from air inlet port 38. The end of the cylindrical portion 44 that is remote from the end 36 of the shell 30 is provided with an inward enlargement 48, see FIG. 7, thus providing a constriction between the end of cylindrical portion 44 and the pipe 46 to act as an ejector.

The conduit 42 defined by liner 40, the wall of shell 30, the cylindrical member 44, and the external surface of pipe 46, thus forms supply means for delivering the natural gas from the inlet port 32. Since the structure is thus of the hot-wall type so that the gas flowing through conduit 42 acts as an insulant, the amount of refractory insulation, if any, required on the shell 30 can be kept relatively small.

Located within liner 40 is a hollow elongated member 50 of circular cross section. This hollow member has an inlet region 52 having an open, flared, end 54 adjacent the ejector terminating the natural gas supply means, a combustion region 56 of greater cross section than the inlet region 52 and containing, at the end thereof remote from inlet region 52, the combustion catalyst 58, and a conical transition section 60 connecting the inlet region 52 with the combustion region 56. Below the combustion catalyst the lower end 62 of hollow member 50 is supported on the end of shell 30. Provision is made, e.g. by providing holes 64 through the wall of the hollow member 50 adjacent the end 62, for gas exiting the combustion catalyst 58 to enter the space 66 between the external surface of the hollow member 50 and the interior surface of liner 40. Part of the gas leaving the catalyst can thus enter space 66 while the rest leaves the shell via outlet port 34. The combustion catalyst comprises a number of honeycomb sections 68 on the surface of which is deposited a suitable metal that has combustion activity. Openings 70 are also provided in the wall of the hollow member 50 between adjacent sections of the honeycomb so that part of the gas stream can enter space 66 without passage through the whole of the combustion catalyst.

The air inlet pipe 46 extends along the length of the inlet region 52 of hollow member 50 and terminates at the commencement of the combustion region 56 thereof. At the outlet of inlet port 38 there is provided a nozzle 72.

In operation natural gas and steam is fed under pressure to inlet port 32 and air is fed under pressure to inlet port 38. The natural gas/steam mixture flows up the space 42 between shell 30 and liner 40, emerges through the ejector formed by constriction 48, then flows down through the inlet and transition regions 52 and 60 of hollow member 50, where it is mixed with air emerging from nozzle 72. The resultant mixture then flows through the combustion region 56 and the combustion catalyst 58 therein. Part of the gas stream leaving the combustion catalyst 58 flows out through outlet port 34 while the remainder flows through holes 64 and 70 into space 66 between hollow member 50 and liner 40. This gas in space 66 flows up towards the end 36 of the shell 30 and is drawn into the inlet region 52 of the hollow member 50 by the effect of the natural gas/steam mixture emerging from the ejector formed by constriction 48. The recycled gas thus mixes with the natural gas/steam mixture and flows down through the hollow member 50.

Initially some reaction takes place as the gas stream passes over the combustion catalyst 58, thereby creating a heated gas stream. The part of the gas stream entering the space 66 via holes 64 and 70 and flowing back to the inlet region 52 of hollow member 50 heats the natural gas/steam mixture flowing through conduit 42 thereby raising the temperature thereof so that the gas entering the combustion catalyst is preheated. The recycled gas also heats the air as the latter flows through the air inlet pipe 46 extending through the inlet and transition regions 52, 60 of the hollow member 50. With continued operation the temperature of the gas entering the combustion region increases until the autoignition temperature is reached whereupon a flame is produced at the nozzle 72. As mentioned above, because of the reforming activity of the combustion catalyst, the gas stream leaving the combustion region 56 of hollow member 50, and hence the gas mixture that is recycled, will contain some hydrogen so that the gas mixture mixing with the air at nozzle 72 contains hydrogen, thereby enabling a flame to be established more rapidly at nozzle 72.

It will be appreciated that when a flame is established, the recycle gas flowing up that portion of the space 66 between the combustion region 56 of hollow member 50 and the inner surface of liner 40 will be heated by heat exchange across the wall of the combustion region 56 and at the same time will heat the natural gas/steam mixture flowing through the corresponding portion of conduit 42 between the inner surface of shell 30 and the outer surface of liner 40. As the recycle gas flows through that part of the space 66 between the external surface of the transition and inlet regions 60, 52 of the hollow member 50 and the interior surface of liner 40, it will heat not only the natural gas/steam mixture flowing through conduit 42 between shell 30 and liner 40, but also the gas flowing through the inlet and transition regions 52, 60 of the hollow member 50.

In an alternative embodiment the liner 40 is omitted and the shell is provided with a refractory insulating layer on its interior surface. In this embodiment the natural gas supply means comprises a pipe, coaxial with the air supply pipe 56, provided at its end with enlargement, corresponding to enlargement 48 in FIG. 7, to form the constriction providing the ejector. In this embodiment there is therefore no preheating of the natural gas stream by the recycle gas before the natural gas stream leaves the feed pipe, but a heated mixture of the natural gas stream and the recycle gas is formed by the simple mixing of the two gas streams prior to the mixing with the air leaving the pipe 46.

In either embodiment suitable projections may be provided on the exterior surface of the hollow member 50 to locate it in the desired spaced relation from liner 40 in the embodiment of FIG. 7 or from the refractory lining in the alternative embodiment. Likewise suitable spacers may be provided between the interior surface of the hollow member 50 in the inlet region 52 thereof and the air pipe 46 to maintain these components in the desired spaced relationship.

One advantage of the recycle in a process where there is only partial combustion and one or both of the oxidant and combustible material streams contain steam, is that, after autoignition at nozzle 72 has been achieved, the hot gas leaving the combustion catalyst will have a temperature somewhat below the maximum temperature in the combustion zone upstream of the catalyst by virtue of the fact that, since the combustion catalyst exerts some steam reforming activity, such reforming, which is endothermic, will take place as the gas passes through the catalyst. The recycled product gas, being cooler than the gas inside the combustion zone thus serves to maintain the hollow member at an acceptable temperature and so it is not necessary that the hollow member 50 has to be constructed of a material that has to withstand very high temperatures.

The catalytic combustion system of FIGS. 6 and 7 can itself conveniently be started up with the natural gas stream being fed at or near the design rate and then the flow of air stream is commenced, at a slow rate, and then the flow rate of the air stream is gradually increased. At slow air flow rates essentially all the combustion takes place in the initial portions of the combustion catalyst. Hence gas that is recycled through the holes 70 (if such holes are provided) is hotter than product gas that passes all the way through the catalyst (since the latter will cool as a result of heat transfer with colder combustion catalyst and/or endothermic reforming taking place) and so the recycled gas is hotter than if there had been no holes 70. By virtue of the recycled gas mixing with the incoming natural gas stream and, where there is a liner 40 as in the embodiment of FIGS. 6 and 7, heat exchange across such a liner, the natural gas becomes preheated before it meets the incoming air. This preheating enables the catalytic combustion to occur earlier in the catalyst containing zone and so enables the air flow rate to be increased more rapidly. Within a short time the air flow rate can be increased to the level at which the product gas has the desired flow rate and temperature. For any given apparatus and flow rate of a natural gas stream of given composition, it will generally be found that the product gas outlet temperature depends on the rate of supply of air to the combustion zone. Hence the process may readily be controlled by controlling the flow rate of the air.

As the flow rate of the air is increased, the amount of recycle will decrease because the addition of the air stream increases the mass of gas that is passing through the system but the "driving force" effecting the recycle, i.e. the product of the mass of the natural gas stream and the difference between the inlet pressure of the natural gas stream and the product gas outlet pressure, remains essentially constant. Furthermore as the recycle gas stream becomes hotter, the efficiency of the ejector decreases.

It will be appreciated that autoignition will generally occur with the production of a flame at the nozzle supplying the air to the combustion catalyst. To avoid damage to the combustion catalyst by such a flame, it is preferred that the air supply means terminates well upstream of the catalyst so that the flame can occur in a catalyst free space upstream of the catalyst.

In the foregoing description, the start-up of the catalytic combustion has been described with the assumption that the natural gas stream flow rate is kept essentially constant. It will be appreciated that this is not necessarily the case. Indeed where autoignition is established in the catalytic combustion vessel upstream of the combustion catalyst, the rate of feed of the natural gas and/or air streams can be increased considerably, after autoignition, since the rates are no longer limited by the need of obtaining combustion in the catalyst.

The catalytic combustion apparatus of FIGS. 6 and 7 is of particular utility where the air and natural gas fed thereto are relatively cool. By providing a small heater, for example electrically operated, to heat the gases fed to the catalytic combustion apparatus to about 150° to 200° C. during the initial stages of the start-up procedure, it will be appreciated that it would be possible to operate the process with a feed of cold reactants, e.g. at ambient temperature. However, normally sufficient heating can be obtained from the steam and/or an external source, e.g. as a result of heating occuring on compression of the natural gas or air to the desired operating pressure, to enable start-up to be achieved without the need for such a heater. As mentioned above catalytic combustion is facilitated by the presence of hydrogen in the combustible material stream fed to the combustion catalyst. Consequently, where a source of hydrogen is available, e.g. purge gas from an ammonia synthesis plant, addition of such hydrogen-containing gas to the combustible gas stream, at least at start-up of the catalytic combustion, is advantageous.

Instead of operating the catalytic combustion such that there is only partial combustion of the combustible material fed to the combustion catalyst, thereby producing a hot pressurised fuel-rich stream as described above, the catalytic combustion can also be operated to give an air-rich hot gas stream from relatively "cold" reactants.

As an example using apparatus of the type depicted in FIGS. 6 and 7 but provided with no openings 70 and dimensioned so that the proportion of the product gas that is recycled, at the design flowrate after autoignition at nozzle 72 has been accomplished, is about 50% of the gas leaving the combustion catalyst, the cylindrical shell is about 3 m length and 40 cm diameter. If a natural gas/steam mixture of steam to carbon ratio of 2.5 is fed at 162 kg mol/hr at a temperature of 200° C. and a pressure of 12 bar abs. as the first gas stream, and air is fed at 146 kg mol/hr at a temperature of 240° C. and 12 bar abs. pressure as the second gas stream, it is calculated that the product gas leaving the shell through outlet port 34 is at 750° C. and has the following composition:

| Nitrogen and argon | 31.7% v/v |
| Carbon dioxide | 7.0% v/v |
| Steam | 29.9% v/v |
| Hydrogen | 25.8% v/v |
| Carbon monoxide | 4.8% v/v |
| Methane | 0.8% v/v |

Under these conditions it is calculated that the natural gas/steam mixture is heated to about 330° C. by the time it leaves ejector formed by constriction 48 and the natural gas/steam/recycle gas mixture entering the transition region has a temperature of about 550° C.. It is calculated that autoignition in the catalytic combustion vessel and steady state conditions can be attained within 5 to 10 minutes of commencing flow of the reactants. The hot gas stream at a temperature of 750° C. leaving the outlet port 34 enables the autoignition temperature of a natural gas/steam mixture fed to the inlet of a burner, for example in the configuration of FIG. 4, to be rapidly achieved. Once that autoignition temperature has been reached the air supply to the burner is commenced to establish a flame. Thereafter the catalytic combustion unit can be shut down by stopping supply of air to port 38 and/or the natural gas/steam supply to port 32. The unit can then be isolated, if desired, by closing port 34. For this application it is calculated that the volume of combustion catalyst in the form of an alumina honeycomb support impregnated with a platinum group metal as the active catalyst need be only about 2.4% of the volume of the secondary reforming catalyst.

By way of comparison, in experiments with a similar arrangement but in which there was no provision for recycle of product gas so that reliance was placed upon transfer of heat back through the catalyst to the combustion zone in order to raise the temperature of the natural gas fed to the combustion catalyst to the autoignition temperature, the time taken to achieve autoignition upstream of the combustion catalyst was over one hour.

We claim:

1. A method of start-up of a continuous process for the production of a gas stream containing hydrogen and carbon oxides wherein reactant streams including
    (a) a stream containing a gaseous hydrocarbon, or hydrocarbon derivative, feedstock, and
    (b) a stream containing an oxidant gas containing free oxygen,
are separately fed, at elevated pressure, to a burner where partial combustion takes place, and the combustion products are fed over a catalyst to bring the combustion products towards equilibrium, comprising
    (i) producing a hot gas stream by effecting at least partial combustion of a stream of a gaseous combustible material and an oxidant gas containing free oxygen,
        said hot gas stream being produced at least initially by catalytic combustion by passing said combustible material and said oxidant gas over a combustion catalyst;
    (ii) heating at least one of the reactant streams, directly or indirectly, with said hot gas stream to a temperature above the autoignition temperature of said reactants and feeding the reactants streams to said burner,
        whereby autoignition of said reactant streams is effected to produce a flame at said burner and self-sustaining combustion of said feedstock is established; and thereafter
    (iii) discontinuing the production of said hot gas stream while continuing feed of said reactant streams to the burner.

2. A method according to claim 1 wherein
    the feed of the combustible material to the combustion catalyst is separate from the feed of the feedstock reactant stream to the burner, and/or
    the feed of the oxidant gas to said combustion catalyst is separate from the feed of the oxidant gas reactant stream to said burner; and
    the production of the hot gas stream by combustion of said combustible material with said oxidant gas is discontinued by discontinuing feed of at least one of said combustible material and said oxidant gas to said combustion catalyst while continuing feed of said reactant streams to said burner.

3. A method according to claim 1 wherein the autoignition is achieved at the burner by heating the feedstock reactant stream by direct or indirect heat exchange with the hot gas stream to a temperature above the autoignition temperature of said feedstock reactant stream and then commencing feed of the oxidant reactant to said burner.

4. A method according to claim 1 wherein either
    (a) the hot gas stream from the combustion catalyst is passed through the conversion catalyst, or
    (b) the effluent gas from the conversion catalyst is passed through the combustion catalyst.

5. A method according to claim 4 wherein the combustion catalyst is upstream of the burner and the hot gas stream from said combustion catalyst is fed to said burner separately or as part of one of the reactant streams.

6. A method according to claim 1 wherein the combustion catalyst is in a separate vessel from that containing the conversion catalyst and, after autoignition has been achieved producing a flame at the burner, said vessel containing the combustion catalyst is by-passed or isolated.

7. A method according to claim 1 wherein, after discontinuing the production of the hot gas stream by combustion of the combustible material with the oxidant gas, the combustion catalyst remains in-line so that one of the reactants;

the combusted gas from the burner; and the gas leaving the conversion catalyst; continues to pass through said combustion catalyst.

8. A method according to claim 1 wherein, at least until autoignition of the reactants at the burner has been achieved, part of the hot gas stream leaving the combustion catalyst is recycled to the inlet thereof.

9. A method according to claim 1 wherein the effluent from the conversion catalyst is indirectly heat exchanged with at least one of the reactants so as to heat the latter.

10. A method according to claim 9 wherein the feedstock fed to the burner is the product of primary steam reforming a hydrocarbon or hydrocarbon derivative and the endothermic heat required for the primary steam reforming reaction is supplied by heat exchange with the effluent from the conversion catalyst.

11. A method according to claim 1 wherein at least one of (a) the feedstock reactant stream fed to the burner;

(b) the oxidant gas reactant stream fed to the burner;

(c) the combustible material stream fed to the combustion catalyst; and (d) the oxidant gas stream fed to the combustion catalyst;

contains steam.

12. A method according to claim 1 wherein the combustible material stream fed to the combustion catalyst contains hydrogen.

* * * * *